United States Patent

[11] 3,610,404

[72] Inventors Fred J. Fleischauer
Oakmont, Pa.;
Theodore A. Hammond, Grand Haven, Mich.
[21] Appl. No. 842,048
[22] Filed May 5, 1969
[45] Patented Oct. 5, 1971
[73] Assignees Ermanco Incorporated
Grand Haven, Mich.;
General Logistics Corporation
Oakmont, Pa., part interest to each

[54] CURVED POWERED ROLLER CONVEYOR
4 Claims, 5 Drawing Figs.
[52] U.S. Cl. .................................................. 198/110,
198/127
[51] Int. Cl. ..................................................B65g 13/02,
B65g 21/12
[50] Field of Search.......................................... 198/34,
110, 127, 181–182

[56] References Cited
UNITED STATES PATENTS
2,487,196  11/1949  Sternad ........................ 198/3 X
FOREIGN PATENTS
152,470  11/1955  Sweden

*Primary Examiner*—Edward A. Sroka
*Attorney*—Wolfe, Hubbard, Leydig, Voit & Osann ABSTRACT: A curved live roller conveyor is described in which a plurality of individual live rollers disposed at angles about the center of conveyor curvature are driven from a common powered drive shaft through a system of pulleys and elastomeric belts. Straight or tapered rollers are used, with pulley diameters being varied to provide constant rotational speed for each driven roller.

PATENTED OCT 5 1971 3,610,404

INVENTORS.
FRED J. FLEISCHAUER
THEODORE A. HAMMOND
BY Wolfe, Hubbard, Voit & Osann
ATTORNEYS.

CURVED POWERED ROLLER CONVEYOR

DESCRIPTION OF THE INVENTION

This invention relates to conveyors and in particular to roller conveyors used to transport individual objects along a pass line. In its principal aspect the invention concerns a belt drive for powering a plurality of individual conveyor rollers in a curved conveyor section.

A principal object of the present invention is to provide an improved band or belt drive for the individual rollers of a curved live roller conveyor It is further intended to provide a curved live roller conveyor section in which the powered rollers each have the same rotational speed and peripheral speed, whereby a conveyed object will be rotated as it traverses the curved section, whereby the object will exit the curved section in the same orientation as it entered.

A more detailed object is the provision of a drive for curved live roller conveyor sections in which a plurality of angled live rollers may be driven from a single straight drive shaft.

Other objects and advantages of the invention will become apparent from reading the following detailed description in conjunction with the drawings, in which.

While the invention is described in connection with certain illustrative preferred embodiments, it will be understood that the invention is not restricted to the particular uses and applications shown and described herein, but on the contrary may be utilized in all conveyor drive applications where a simple and reliable live roller drive is required for curved conveyor sections.

Figure 1:
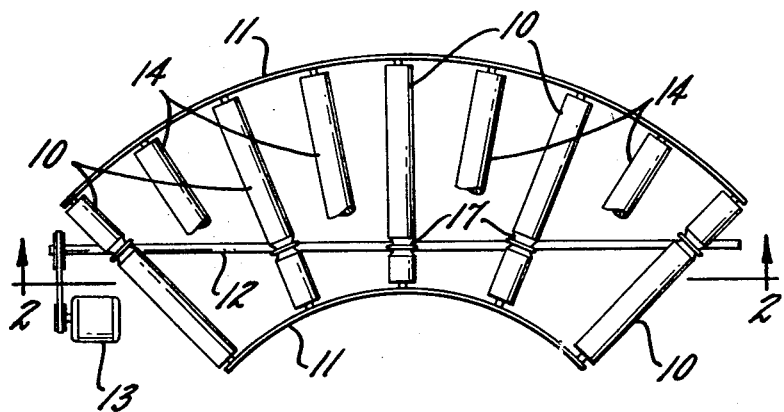
FIG. 1 is a plan view of a curved portion of a live roller conveyor exemplifying the present invention.

Turning now to conveyor drawings, there is shown in FIG. 1 in simplified form an exemplary curved portion of a live roller conveyor in which individually powered transverse rollers 10 are supported for rotation on curved conveyor rails 11, and are each individually driven from a drive shaft 12 positioned adjacent the pass line of the conveyor. The pass line is defined as the plane which includes the upper surfaces of the rollers, and it will be seen that the individual rollers 10 are each angled with respect to one another in the pass line plane. In the exemplary embodiments shown, the drive shaft 12 is disposed beneath the pass line a uniform distance from each of the live rollers 10. It will be understood that nonpowered rollers (not shown) may be interposed between each of the live rollers 10 without departing from the invention. The drive shaft 12 is powered for rotation by a motor 13.

As a principal feature of the invention, each of the powered live rollers 10 is individually driven at a uniform rotational speed by the drive shaft 12, even though the angle between each of the rollers 10 and the drive shaft 12 is different from roller to roller. This is accomplished through the use of a plurality of spool-shaped drive pulleys 16 carried for rotation by the drive shaft 12. Power is transferred from each pulley 16 to its associated roller 10 through a resilient drivebelt 18, preferably of circular cross section such as an O-ring The belt is preferably of a resilient elastomeric material so that it can stretch under tension in use. The belt 18 is looped around the pulley 16, turned through an angle corresponding to the roller 10 to which it is to be attached, and looped over its associated roller 10, Each roller 10 is provided with a driven pulley which, in the illustrated embodiments, consists of a spool-shaped section 17 of smaller diameter than its adjoining roller portions. The spool-shaped section 17 may also consist of a groove or depression in the roller surface, but in either case it is necessarily of smaller diameter than its adjoining roller portions so that the periphery of the drivebelt 18 does not protrude above the plane of the pass line.

It will be observed that the spool-shaped portion 17 of each of the live rollers 10 is located at a position along the length of the roller 10 corresponding to the position of the drive shaft 12 beneath the curved conveyor section. This is so that the individual drive pulleys 16 carried by the drive shaft 12 are each disposed adjacent a corresponding powered roller 10, allowing the use of belts 18 of uniform length for each of the rollers 10 of the curved section.

Figure 5:
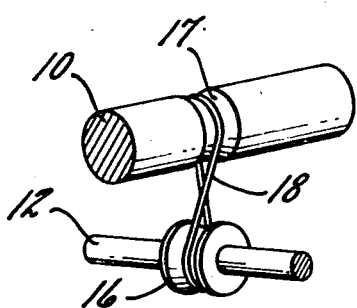
FIG. 5 is an enlarged detail in perspective of the pulley and drive belt used in the foregoing exemplary embodiments of the invention.

Preferably, the drive pulleys 16 are constructed as shown in FIG. 5, with each pulley 16 being rotatably carried by the drive shaft 12 and slippable thereon to provide a friction drive. This allows the drive shaft 12 to continue rotating even if one or more of the live rollers 10 should be halted for any reason. Furthermore, each drive pulley 16 is preferably made axially shiftable along the drive shaft 12 in a manner described in our copending patent application Drive for Roller Conveyors, Ser. No. 842,043 filed May 5, 1969. The latter feature allows each drive pulley 16 to seek its optimum driving position along the drive shaft 12 with respect to its associated roller 10.

Figure 3:
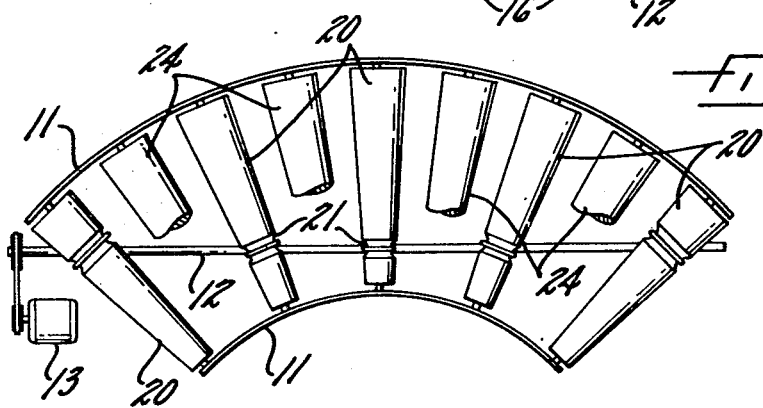
FIG. 3 is a plan view of a second exemplary structure utilizing tapered rollers.
Figure 4:
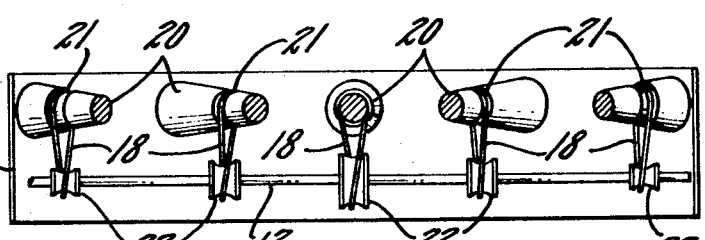
FIG. 4 is a side elevation of the structure of FIG. 3.

As shown in the second exemplary embodiment of FIGS. 3 and 4, tapered live rollers 20 may also be used. Each driven roller 20 is preferably tapered uniformly along its length, with decreasing diameter toward the center of conveyor curvature. In this way the peripheral or linear speed of the roller surface varies with radius from the center of conveyor curvature, so that a conveyed object is moved faster toward the outside of the conveyor section than at the inside. This allows the object to maintain its orientation upon passing through the curved conveyor section, leaving the curved section in the same orientation relative to its direction of movement as when it entered. In this embodiment, the driven pulleys again consist of spool-shaped sections 21 in the surface of their respective rollers 20, but it will be observed that the sections 21 are of different diameter, corresponding to their varying positions along the length of the tapered rollers 20. As a further feature of the invention, the tapered rollers 20 are driven at a constant rotational speed by providing drive pulleys 22 of varying diameter. The diameter of each drive pulley 22 varies in inverse proportion to the spool-shaped section 21 on the tapered roller 20 with which it is associated. For this reason rotation of the drive shaft 12 by the motor 13 results in uniform rotational speed for each of the driven tapered rollers 20.

Figure 2:
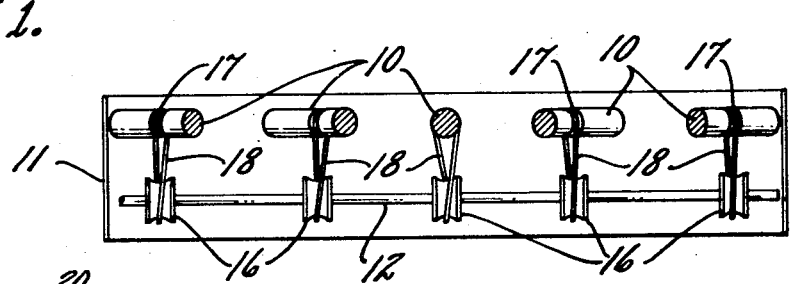
FIG. 2 is a side elevation of the structure of FIG. 1.

It will be appreciated that the friction drive feature described in connection with the embodiment of FIGS. 1 and 2 is also usefully employed in the embodiments of FIGS. 3 and 4. The drive pulleys 22 of varying diameter are also desirably made shiftable along the drive shaft 12 in the same manner. In either of the illustrative embodiments, the slippable friction drive feature may also be incorporated by providing a separate slippable pulley for each straight roller 10 or tapered roller 20 in place of the spool-shaped sections 17, 21 as described. In the latter case, the drive pulleys 16, 22 may be fixed to the drive shaft 12 since the frictional connection is provided in the rollers 10, 20 instead of at the drive shaft 12.

The following is claimed as invention:

1. In a live roller conveyor, a plurality of angled rollers disposed in a common plane to define a curved pass line, a powered straight drive shaft, a friction clutch drive means interconnecting said straight drive shaft with certain of said rollers, said friction clutch drive means including a driven pulley carried by each of said certain rollers and a corresponding drive pulley carried by the drive shaft adjacent each said driven pulley and a drivebelt looped between each of said adjacent pulleys.

2. Apparatus as defined in claim 1 in which said driven pulley has a smaller diameter than the adjoining roller portions, and one of each said adjacent drive and driven pulleys is rotatably carried for slippable friction drive.

3. Apparatus as defined in claim 1 in which the rollers are tapered toward the center of pass line curvature with the driven pulleys being formed in the surface of the live rollers, and with the straight drive shaft intersecting the live rollers at points of varying roller diameter and driven pulley diameter, and in which the diameter of the drive pulleys varies in inverse proportion to the diameter of the driven pulleys, whereby the rotational speed of each live roller is substantially the same.

4. Apparatus as defined in claim 1 in which each of said driven pulleys is rotatably carried and axially shiftable on said drive shaft for slippable frictional drive, whereby each drive pulley may seek its position of optimum driving efficiency.